United States Patent [19]

Henmi

[11] Patent Number: 5,675,428
[45] Date of Patent: Oct. 7, 1997

[54] OPTICAL COMMUNICATION APPARATUS

[75] Inventor: Naoya Henmi, Tokyo, Japan

[73] Assignee: NEC Corporation, Tokyo, Japan

[21] Appl. No.: 565,935

[22] Filed: Dec. 1, 1995

Related U.S. Application Data

[63] Continuation of Ser. No. 298,674, Aug. 31, 1994, abandoned.

[30] Foreign Application Priority Data

Aug. 31, 1993 [JP] Japan .................. 5-215649

[51] Int. Cl.$^6$ .................................. H04B 10/00
[52] U.S. Cl. .................. 359/161; 359/134; 359/160; 359/173; 359/179; 385/122
[58] Field of Search .................. 359/110, 124, 359/126, 161, 134, 156, 173, 179, 188, 195, 174, 326, 341; 385/122

[56] References Cited

U.S. PATENT DOCUMENTS 5,365,362  11/1994  Gnauck et al. .................. 359/174
5,386,314  1/1995  Jopson .................. 359/326

OTHER PUBLICATIONS

Electronics Letters, vol. 25, No. 11, May 25, 1989, pp. 702–703, Fujita et al.: "10Gbit/s, 100km optical fibre transmission experiment using high–speed MQW DFB-LD and back–illuminated GaInAs APD".

Optics Letters, vol. 4, Feb. 1979, pp. 52–54, A. Yariv et al.: "Compensation for channel dispersion by nonlinear optical phase conjugation".

Electronics Letters, vol. 29, No. 7, Apr. 1, 1993, pp. 576–578, R.M. Jopson et al.: "Compensation of fibre chromatic dispersion by spectral inversion".

Primary Examiner—Kinfe-Michael Negash
Attorney, Agent, or Firm—Sughrue, Mion, Zinn, Macpeak & Seas

[57] ABSTRACT

It is an object of the invention to provide an optical communication system, which suppresses wave distortions of signal light waves arisen from group velocity dispersion of a transmission line. The optical communication apparatus comprises optical transmitter 100 and optical transmission lines, which consist of optical fibers. The optical transmitter transmits signal and probe light waves simultaneously, and spectrum-inverted wave is generated by nonlinear interaction between the two said waves in the optical nonlinear section. The spectrum inverted wave behaves as a phase conjugated wave, and wave distortion arisen from dispersion of a line can be remarkable decreased when a signal light wave arrives at the terminal of a line. The optical transmitter comprises two light wave sources for signal and probe light waves, and thereby wavelength separation and polarizations of these waves can be stabilized without difficulty.

16 Claims, 6 Drawing Sheets

OPTICAL COMMUNICATION APPARATUS

This is a Continuation of Application No. 08/298,674 filed Aug. 31, 1994 now abandoned.

FIELD OF THE INVENTION

The invention relates to optical communication system and more particularly to, high bit-rate and long-span trunk line optical communication system.

BACKGROUND OF THE INVENTION

In a conventional optical communication system, intensity modulated light signals, which are directly modulated in a semiconductor laser, propagate through an optical fiber in a cable, and are received by a light receiving apparatus employing photoelectric converting devices at receiving end of a cable. Such systems are used to send optical communications on trunk lines, and used as communication apparatuses for long-span and large capacity data transmission systems. For example, a system with data-rate of about 500 Mb/s is put into practical use for data transmission over distances exceeding 150 km without using a repeater. Moreover, researches and development on data transmission systems with ultra large capacities, such as 10 Gb/s, have been carried out successfully. This is described, for instance, in a report Fujita et al. entitled "10 G/s, 100 km optical fiber transmission experiment using high-speed MQW DFB-LD and back-illuminated GaInAs APD", which appeared in Electronics Letters, Vol. 25., No. 11, 1989, pages 702 to 703.

Recently, experiments have been performed on ultra-long-span optical fiber transmission over a distance of nearly 10,000 km. For example, one of these studies is described in the report by H. Taga et al. entitled "10 Gb/s, 9000 km IM-DD transmission experiments using 274 Er-doped fiber amplifier repeaters", which is reported in Optical Fiber Communication Conference 1993, Postdate-line paper PD-1. In this experiment, Erbium-doped-fiber optical amplifiers are used as optical direct amplifying repeaters, which show excellent performances at 1.5 µm band.

As research and development is progressing, optical communication systems are being put to practical use. To send optical communications on trunk lines, systems with data rate of 2.5 Gb/s at 1.3 µm are being operated. However, the minimum loss of the optical fiber is 0.2 dB/km at 1.5 µm by nature, and therefore communication at 1.5 µm is the most suitable from the viewpoint of long distance transmissions on trunk lines. While, in conventional optical fibers ordinary used, the zero in the group-velocity dispersion is located at 1.3 µm, and have large group-velocity dispersion in 1.5 µm-band. Therefore, distortions of signal waves after propagation become large, and transmission distance is limited considerable. For instance, in a case of data transmission of 10 Gb/s, when employing an optical transmitter with a semiconductor laser directly modulating optical signals, a transmission distance is limited to several kms, and even when employing that with an external modulator, which is researched and developed vigorously in recent years, a transmission distance is limited to 30 to 40 km.

In order to suppress such signal distortions caused by group-velocity dispersion, the use of "1.5 µm-optimized" fibers, in which the zero of group-velocity dispersion is shifted to 1.5 µm-region, becomes prosperous. However, most of embedded optical fibers in the world is conventional fibers, and therefore it is not profitable to replace embedded fibers by "1.5 µm-optimized" fibers. Accordingly, great progress in dispersion compensating technology, which is intended to compensate for dispersions present in embedded conventional optical fibers, is expected. Looking ahead, it is supposed that a ultra-multiplexed communication system through "1.5 µm-optimized" single mode fiber, using 1.3 µm and 1.5 µm light waves simultaneously, may be realized in the near future. From this point of view, it is important to develop dispersion compensating technology for the above mentioned system, because "1.5 µm-optimized" fiber has large dispersion at 1.3 µm region.

As a method for compensating dispersion in transmission line, the use of optical fiber with normal dispersion as dispersion compensating fiber is proposed and described, for example, in a report by H. Izadpanah et al. entitled "Dispersion compensation for upgrading interoffice networks built with 1313 nm optimized SMFs using an equalized fiber, EDFAs and 1310/1550 mm WDM", which is reported in Optical Fiber Communication Conference 1992, Postdate-Line paper, PD-15. A dispersion compensation method using pre-chirped signal, which is generated in an optical transmitter, is described by N. Henmi et al. in an article entitled "A novel dispersion compensation technique for multi-gigabit transmission with normal optical fiber at 1.5 micron wavelength", which is reported in Optical Fiber Communication Conference 1990, Postdate-line Paper PD-8.

There is a proposal to compensate dispersion by using phase conjugated light wave, which is described in a paper by A. Yariv et al. entitled "Compensation for channel dispersion by nonlinear optical phase conjugation", which appeared on Optics Letters, Vol. 4, No. 2, 1979, pages 52 to 54. Moreover, there are several reports on transmissions of optical signals using phase conjugated light waves generated by four-wave mixing in optical fibers. For example, one is described in Japanese Patent Kokai No. 3-125124, and another one is described in a paper by R. M. Jopson et al. entitled "Compensation of fiber chromatic dispersion by spectral inversion", which appeared on Electronics Letters, Vol. 29, No. 7, 1993, pages 576 to 578.

As described in the above, the several dispersion compensation methods. However, these methods have disadvantages respectively, which are described as follows.

It is difficult to manufacture a normal dispersion optical fiber which can compensate for a large dispersion, and an optical amplifier becomes necessary to compensate for the loss caused by a normal dispersion fiber. Hence the system cost rises, and its construction become complicated.

It is easy to apply a pre-chirp method, however, extent of compensation by this method is limited, and therefore it is difficult to apply this method to a transmission over an ultra-long distance with large dispersion, especially to an optical amplifying repeater system extending along a ultra-long span.

In a case of dispersion compensation using a phase-conjugated light wave, there is no limitation on extent of compensation, however, this method has some disadvantages described as follows. We have few means to adequately generate phase-conjugated light waves, and devices used for this purpose have strong dependences on polarizations of light waves.

Moreover, a light source for generating transmission signals, and a light source for generating a probe signal, both of which are indispensable for generating phase conjugated light waves, must be located at separate positions. That is, the former and the latter must be located in a transmitter and a repeater, respectively. Therefore different standard at two different point become necessary, and thereby two wavelengths must be stabilized independently.

SUMMARY OF THE INVENTION

Accordingly, it is an object of the invention to provide phase conjugated waves for compensating dispersion of signal waves while maintaining stability and without difficulties, and to provide an optical communication apparatus by which signal waves with little distortions can be received even after transmission through a transmission line with large dispersion.

According to the feature of the invention, an optical communication apparatus comprises:

an optical transmitter, optical transmission lines, an optical receiver and an optical nonlinear section, wherein:

The optical transmitter and the receiver play roles of optical terminals, and the optical terminals are cascade-connected by the optical transmission lines and the optical nonlinear section.

The optical communication apparatus comprises:

the optical transmitter which transmits at least two light waves involving a signal light wave and a probe light wave, the optical nonlinear section which generates optical spectrum component arisen from optical nonlinear interaction between the signal and probe light waves, and the optical receiver which receives only the optical spectrum component arisen from the optical nonlinear interaction.

BRIEF DESCRIPTION OF THE DRAWINGS

The invention will be explained in more detail in conjunction with appended drawings, wherein.

DESCRIPTION OF THE PREFERRED EMBODIMENTS

Next, the first preferred embodiment of an optical communication apparatus will be explained referring to FIGS. 1 to 2.

A signal light wave and a probe light wave are supplied from a sending end of an optical transmission line simultaneously, wherein wavelength separation between two light wave is very small. The signal and probe light waves are applied to an optical nonlinear section, after propagating through a transmission line, or a transmission line containing at least one optical amplifier. In the optical nonlinear section, a spectrum-inverted light wave with respect to the signal light wave are generated as result of nonlinear interaction between signal and probe light waves, which is known as four-wave mixing effect. In a spectrum-inverted wave, a high (low) frequency component of the spectrum of a signal light wave supplied from the sending end is shifted to a low (high) frequency component of its spectrum. Accordingly, a spectrum-inverted wave can be called a phase-conjugated wave.

Wave distortions of a signal light wave are caused by a spectrum-spread of a light source and group velocity dispersions of a transmission line. In other words, wave distortion of a signal wave arises from the fact that there is a difference between propagation times of high and low frequency components of a signal wave. Accordingly, if we interchange high and low frequency components with each other about the middle point of a transmission line, wave distortion caused by line transmission can be canceled out.

Spectrum inverting carried out in the optical nonlinear section is certainly the operation to interchange high and low frequency components of the optical signal wave with each other.

Therefore, if we make dispersion of the transmission line between the transmitter and the optical nonlinear section be nearly equal to that between the optical nonlinear section and the optical receiver, distortions of signal wave forms are eliminated. Moreover, both the signal and probe light sources are provided at the sending end of the transmission line, and wavelengths of two light sources can be controlled by using a well known optical frequency standard device such as an optical filter and etc., which is positioned at one point, and the wavelength of the light wave to be used for transmission can be specified at the transmitter side.

Figure 1:
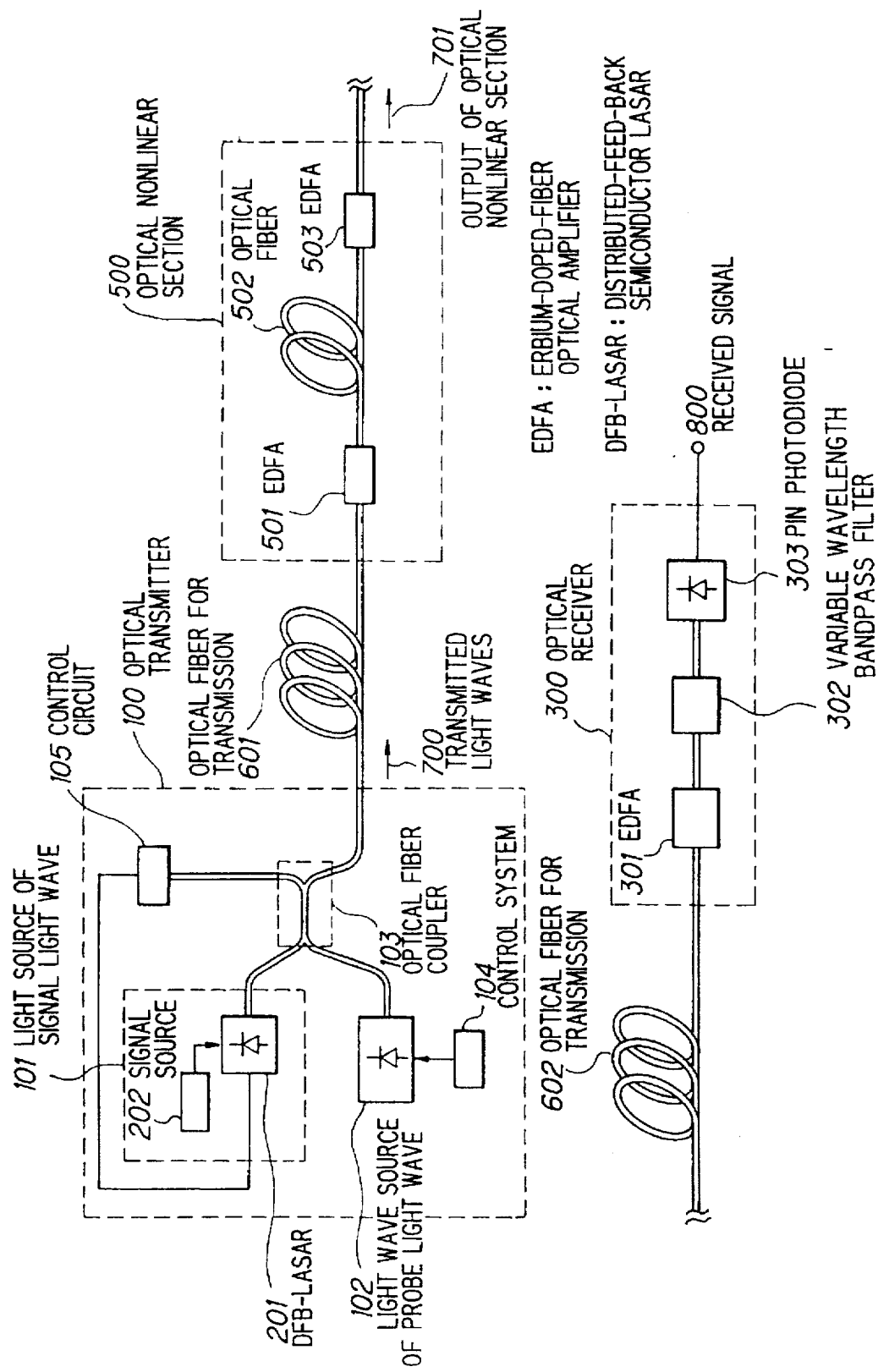
FIG. 1 shows first preferred embodiment according to the invention.

In FIG. 1, the transmitter 100 contains two optical sources, one 101 generating a signal light wave of 1.550 μm, and the other one 102 generating a probe light wave of 1.553 μm.

Each of output powers of two light sources is set for about +3 dBm. These light waves are multiplexed by optical fiber coupler 103 and supplied to an optical transmission line 601. The light source 102 for a probe light wave is stabilized by ordinary temperature and an injection current control system 104.

The light source 101 for a signal light wave is stabilized by a control circuit 105, such that the wavelength separation of two aforementioned light waves can be adjusted in 2 nm steps, employing ordinarily used Fabry-Perot-Etalon optical filter as the standard. The light source 101 for a signal light wave contains a distributed-feed-back semiconductor laser 102, which oscillates in single-longitudinal mode and is modulated directly by an injection current supplied from a signal source 202 of 10 Gb/s. An optical receiver 300 employs an erbium-doped-fiber optical amplifier 301 as an optical pre-amplifier, and is provided with a variable-wavelength bandpass filter 302 with a bandwidth of 1 nm. A InGaAs PIN photodiode 303 is used as a photo-electrical converting device. The sensitivity of the receiver 300 at 10 Gb/s is −30 dBm. The optical nonlinear section 500 is consisted of an erbium-doped-fiber optical amplifier 501, a 1.55 μm-optimized optical fiber 502 of 10 km and an erbium-doped-fiber optical amplifier 503, which amplifies the light waves supplied from an optical fiber 502. Optical fibers for transmission 601 and 602 are conventional optical fibers with lengths of 50 km. The group velocity dispersion of each fiber is nearly equal to zero at 1.3 μm, however, has a larger value of 18 ps/km/nm at 1.5 μm region.

Figure 2A:
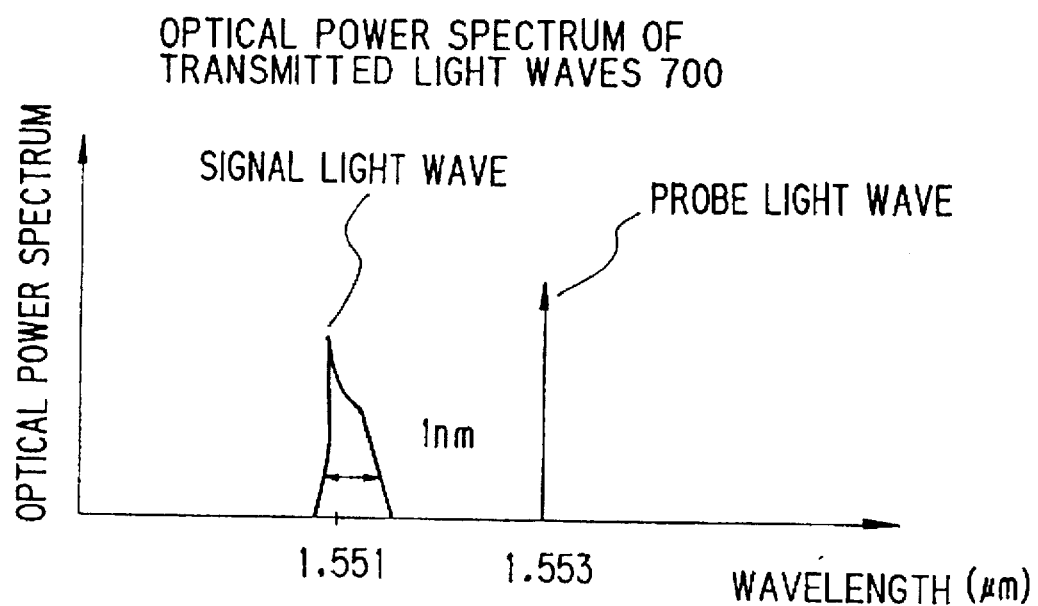
FIGS. 2A and 2B explain the operation of the first preferred embodiment according to the invention.
Figure 2B:
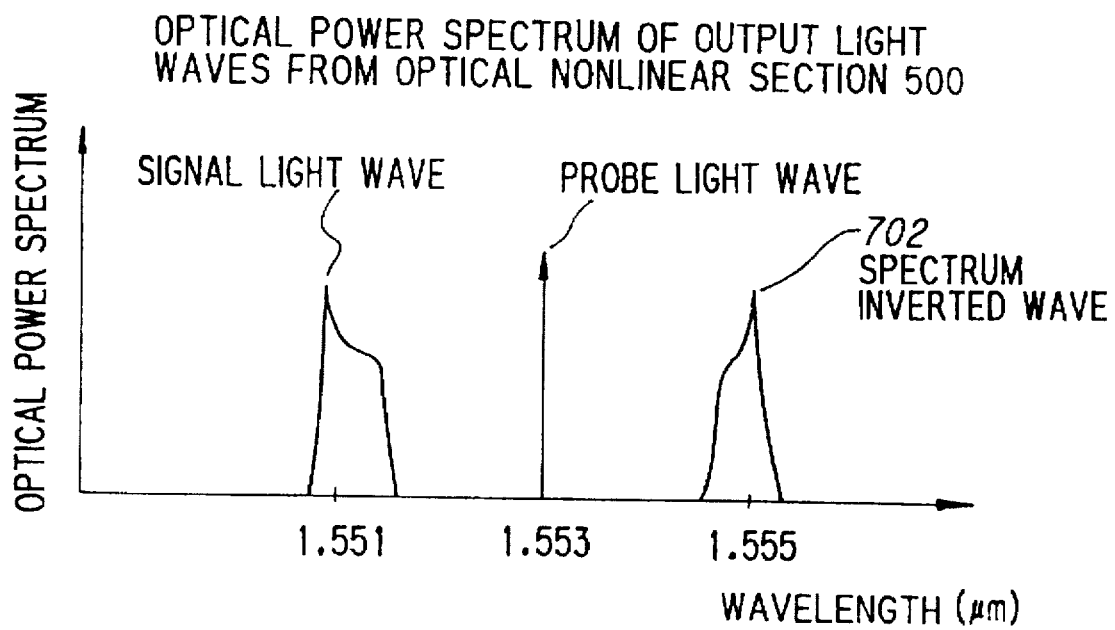

The signal light wave with the 1.55 μm central wavelength of 1.55 μm and the spectrum spread of 1 nm at −10 dB points, and the 1.553 μm probe light wave are multiplexed and sent out from the optical transmitter 100. The spectrum of the transmitted waves 700 are shown in FIG. 2. These light waves are applied to the optical nonlinear section 500 after passing through the optical fiber 601. Each of these optical powers is decreased to −12 dBm at this point. In the optical nonlinear section 500, each of these light waves is amplified by the erbium-doped-fiber amplifier 501 by 20 dB, and its power level becomes +8 dBm. Thereafter, these optical waves are supplied to the 1.5 μm-optimized optical fiber 502. In the optical fibers 502, the spectrum inverted wave 702 with the power level of −5 dBm is generated by four-wave mixing effect, and amplified by the erbium-doped-fiber amplifier 503 by about 10 dB together with other light waves. The output light waves of the optical-nonlinear section 500 are denoted by 701. The power spectrum of input and output light waves are shown in FIG. 2A and FIG. 2B respectively. The output power 701 is received by the optical receiver 300. The light waves 700 and the spectrum inverted light wave 702 are amplified simultaneously by the optical amplifier 301, and only the spectrum-inverted wave 702 is selected out of other light waves by the variable wavelength optical bandpass filter 302 and detected by the PIN diode 303. Before the experiment, the optical nonlinear section 500 is removed and the optical fibers 601 and 602 are cascade-connected and the total length of the transmission line becomes 100 km. In this condition, large wave distortions arise after transmission, and transmitted signals cannot be received. On the other hand, in the present invention when the spectrum-inverted wave is received at the receiving end of the transmission line, wave distortions are eliminated and a decrease of the sensitivity by dispersions cannot be observed. Moreover, the wavelengths of the signal and probe light waves can be controlled at the transmitter, and the wavelength region to be used can be easily selected at the sending end of the transmission line.

Figure 3:
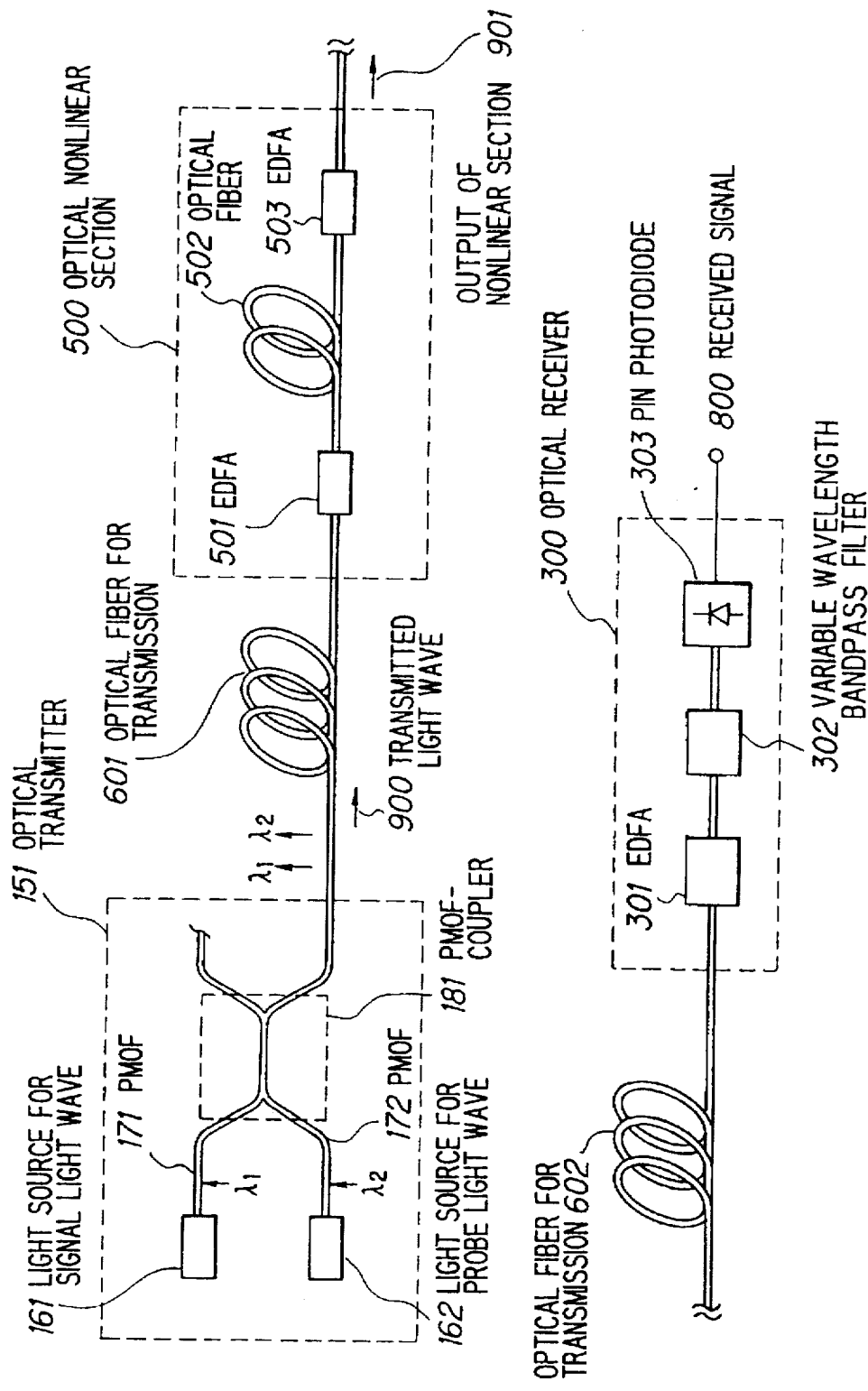
FIG. 3 shows second preferred embodiment according to the invention, FIG. 4 show third preferred embodiment according to the invention.

Next, the second preferred embodiment of an optical communication apparatus will be explained referring to FIG. 3. In the second preferred embodiment, polarizations of signal and probe light waves are supplied to an optical fiber with prescribed polarizations respectively at the sending end of a transmission line. In an ordinary optical fiber for transmission, polarization of supplied wave cannot be maintained during propagation. That is to say, the state of polarization of light wave at the sending and differs from that after propagation. It is due to the fact that there is fluctuation of polarization of a light wave propagating through an optical fiber. However, when two light waves with different wavelengths and the same polarizations are supplied to optical fibers, the relative relation between polarizations of two light wave sis maintained for considerable distance, although fluctuation of polarizations arises in an optical fiber. For example, if polarization dispersion τm of an optical fiber with the length of 100 km is assumed to be 1 ps, and the frequency separation between two different light waves is 150 GHz, the following relation holds.

$$f_b < 1/(2\tau m)$$

(150 Ghz) (500 Ghz)

Accordingly, these light waves can propagate for 100 km, maintaining the relative relation between their polarizations at nearly the same situation. Taking notice of this fact, it can be expected that, if the signal and probe light waves are supplied from the sending end on certain conditions of polarizations, these waves are applied to the nonlinear section, which has strong dependency on relative relation between polarizations of input waves, with nearly the same polarizations or the prescribed relation between them. Thereby, stable optical nonlinear effect with high efficiency can be achieved.

The difference between the first and the second embodiments lies in the constructions of the optical transmitters. In the optical transmitter 151, the light source 161 for the signal light wave with the wavelength of $\lambda_1$=1.552 μm and that 162 for the probe light wave with the wavelength of $\lambda_2$=1.554 μm supply the optical powers through polarization-maintaining optical fiber 171 and 172 respectively, which are multiplexed by the polarization-maintaining optical fiber coupler 181.

In this embodiment, the 10 Gb/s intensity-modulated linearly polarized light wave are supplied from the light source 161 for the signal light wave. A semiconductor-absorbing external modulator is used to carry out 10 Gb/s intensity modulation. This signal light wave propagates through the polarization-maintaining optical fiber (PMOF, hereinafter) 171 and led to the polarization-maintaining optical fiber coupler (PMOF-coupler, hereinafter) 181. Similarly, the linearly polarized light wave supplied from the light source 162 for the probe light wave is led to the PMOF-coupler 181 through the PMOF 172. Then, input light waves form optical sources 161 and 162 are supplied to the PMOF-coupler 181, such that polarizations of input and output light waves of the PMOF-coupler 181 are all the same. The optical output powers of light sources 161 and 162 are +5 dBm respectively. The transmitted light waves 700 are applied to the optical nonlinear section 500 after propagating through the conventional optical fiber 601 of 50 km. The optical signal and probe powers supplied to the optical nonlinear section 500 are −10 dBm respectively. Therein, the polarization dispersion of the transmission line 601 is about 0.7 ps, which is nearly equal to that supposed on an ordinary optical fiber of 50 km. The condition, which is imposed on wavelength separation of signal and probe light waves, that polarizations of these light waves, which are supplied to the optical fiber 601 for transmission at its sending end with the same polarizations, approximately agree with each other after these waves propagate over the distance of 50 km, is that wavelength separation should be smaller than 5.3 nm. (700 GHz), if based upon the value of polarization dispersion of 0.7 ps. In this embodiment, the wavelength separation is 2 nm (260 GHz), and an orthogonally polarized component of the probe light wave is less than 20% and an equally polarized component is more than 80%, even in the worst condition. Generally speaking, in an optical fiber, efficiency of four-wave mixing effect between two orthogonally polarized light waves is decreased to about 1/10. However, in the experiment according to this embodiment, decrease of efficiency is less than −1 dB. Accordingly, the stable four-wave mixing effect can be achieved, and the stable communication without wave form distortion can be maintained for long time.

Next, the third preferred embodiment will be explained referring to FIG. 4. In this embodiment, when dispersion of a transmission line is large, efficiency of optical nonlinear phenomenon in an optical nonlinear section is detected, and sent back to an optical transmitter by any means, and therein polarizations of signal and probe waves are controlled. As explained in the second preferred embodiment, in a transmission line with small dispersion of a short distance, relative relation between polarizations of signal and probe waves can be held at desired condition, however, when a transmission line is elongated, or its dispersion is large, the aforementioned method is not applicable. Then, it is the feature of this embodiment to detect a efficiency of nonlinear phenomenon in an optical non linear section, and feed-back to a polarization controller in an optical transmitter to maintain a stable efficiency of optical nonlinear phenomenon.

Figure 4:
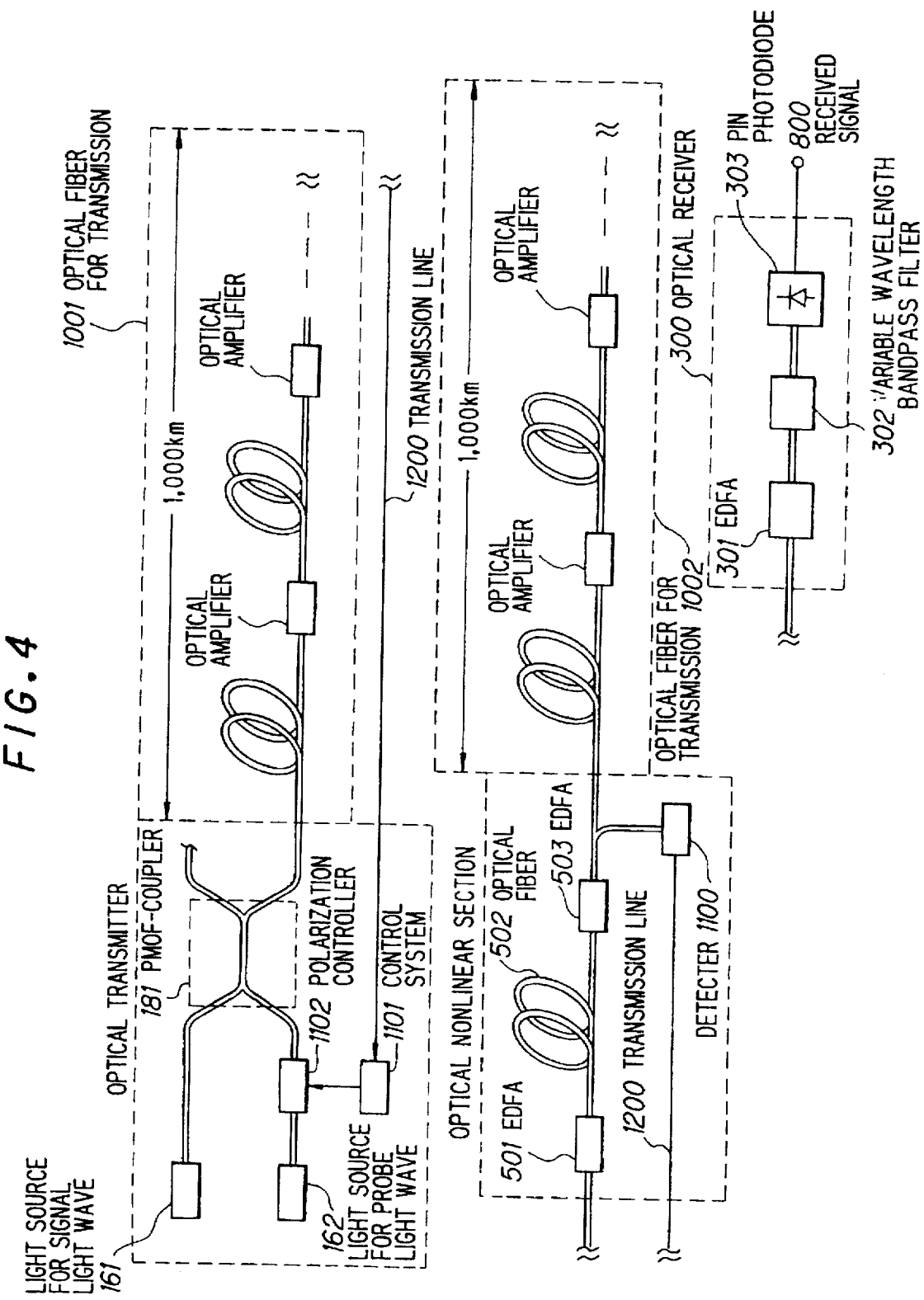

When optical fibers 1001 and 1002 contain optical direct-amplifiers respectively and the total length of optical fibers is more than 1000 km, as shown in FIG. 4, the influence of polarization dispersion cannot be neglected. Then, the detector 1100 detection the power of the spectrum-inverted wave is provided at the output side of the optical nonlinear section 500, and a signal derived from the detector 1100 is sent back to the transmitter through the other transmission line 1200, and applied to the control system 1101, which controls the polarization controller 1102. Generally, the optical fiber for transmission has two fundamental polarization modes, which are not influenced by polarization dispersion. When transmitted light waves are equally polarized to the one of the fundamental polarization modes using the polarization controller 1102, the best efficiency can be achieved in the optical nonlinear section 500. In the experiment according to this embodiment, an observed fluctuation of a polarization occurs at the rate less than several tens Hz, which is sufficiently slower than the bandwidth of the feedback loop of 300 Hz involving transmission delay. Accordingly, in a case of practical use, the bandwidth of the feedback loop is set at 150 Hz, and the spectrum inverted wave can be obtained always at the best efficiency, and the stable transmission characteristic with small wave distortions can be achieved.

In the fourth preferred embodiment according to the invention, we make a phase conjugated wave, in other words, a spectrum inverted wave, arise in an optical fiber, which is functioning as a light waves transmission line. Four-wave mixing effect of light waves arises with high efficiency in a wavelength region, in which dispersion of a signal light wave is small, and the efficiency decreased when dispersion is large. Accordingly, when a transmission line containing optical fibers is installed, optical fibers with small dispersion are laid beforehand as a part of a transmission line, which has roles of transmitting light waves and generating spectrum inverted waves.

Figure 5:
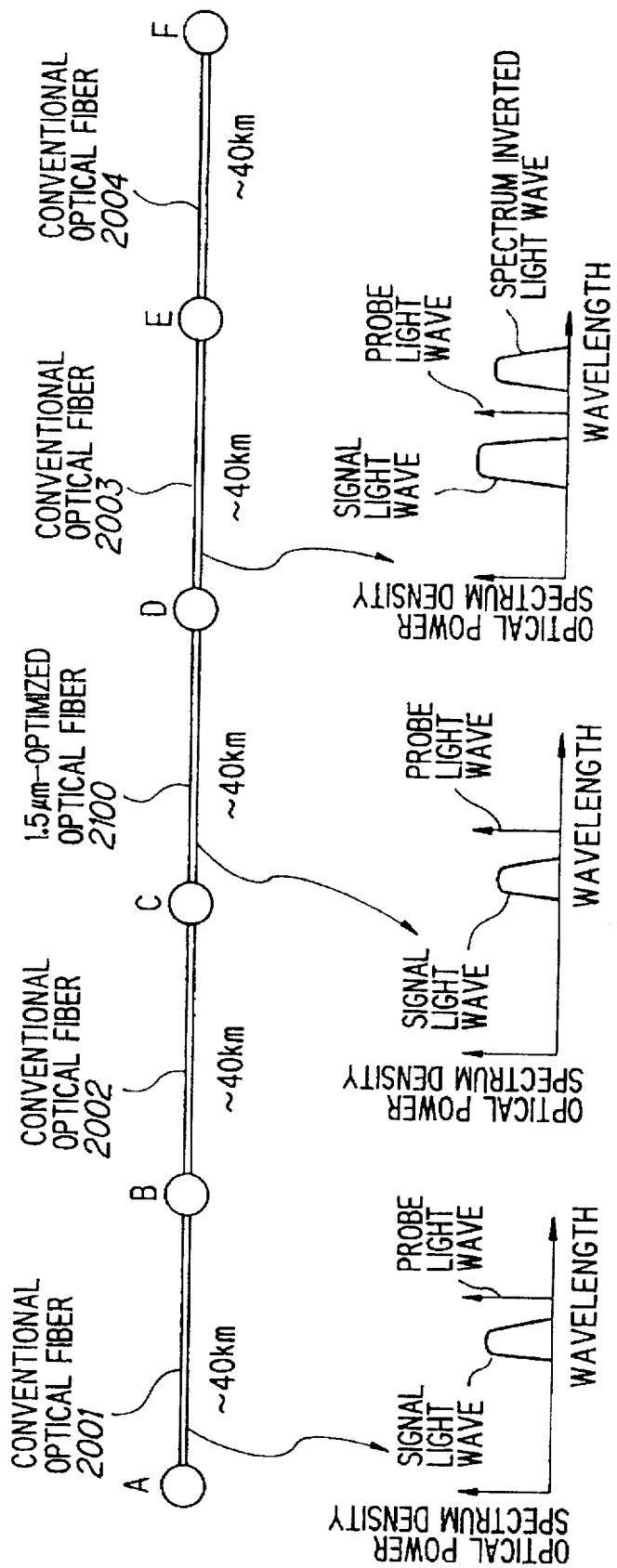
FIG. 5 shows fourth preferred embodiment according to the invention.

FIG. 5 shows typical state of installation of optical fibers in a certain transmission line. In this drawing, conventional fibers 2001, 2002, 2003 and 2004 connect points A-B, B-C, D-E and E-F respectively, and a length of each fiber section is about 40 km. A 1.5 μm optimized optical fiber 2100 of 40 km is laid between points C-D. Then, a light wave modulated with 10 Gb/s signal and a probe wave are supplied to an optical fiber 2001 at point A, and are repeated at points B, C, D and E, and arrive at terminal point F. An optical transmitter shown in FIG. 3 is provided at point A. At point B, the light waves transmitted from point A are amplified by an optical-directly-amplifying repeater up to about 0 dBm and sent out to point C.

At point C, the light waves transmitted from point B are amplified up to +10 dBm, and supplied to a 1.5 μm optimized optical fibre 2100. Since, in an optical fiber 2100 for transmission, propagating powers are large and dispersion is small, light waves propagate accompanying generation of a spectrum inverted wave, which arrives at node D. In nodes D and E, received optical signals are directly amplified and sent to node F. In node F, only a spectrum inverted wave is selected out of other received waves by an optical bandpass filter. By establishing transmission circuit between points A and F in the above mentioned way, a stable transmission system with small wave form distortion can be realized.

A 1.5 μm optimized optical fiber for light waves transmission which is laid between points C and D is used as a part of an optical nonlinear section, and the total cost to the system can be decreased. Moreover, requirement to contain optical fibers with long lengths in an optical nonlinear section is eliminated, which contributes to down-sizing of hardwares.

Next, the fifth preferred embodiment according to the invention will be explained referring to FIG. 6. This embodiment provides a means to solve problems arisen from saturations of optical output powers of optical amplifiers, when the first embodiment of the invention is applied to multi-stage optical repeating system consisted of with several optical amplifiers. When the first embodiment of the invention shown in FIG. 1 is applied to an actual optical directly-amplifying repeater system, light waves sent out form an optical transmitter are applied to an optical nonlinear section. Let us consider the case, in which an optical fiber is used as an optical nonlinear medium, for example. In an optical nonlinear section, input light waves are generally amplified an sent out optical powers with high levels, however, a power level of a spectrum-inverted wave is low. Consequently, in optical amplifiers provided along a behind section of an optical transmission line, saturations of amplifiers arise from signal and light waves supplied from a transmitter side, and therefore, an amplification of a spectrum inverted becomes low.

This preferred embodiment according to the invention introduces a means for selecting only a spectrum inverted wave into a nonlinear section, for the purpose of suppressing saturations of optical amplifiers positioned along a transmission line.

As described in the above, the fifth preferred embodiment according to the invention limits a light wave passing through an optical nonlinear section only to a spectrum inverted wave. The construction of this embodiment is shown in FIG. 6. In this construction, a variable wavelength bandpass filter 3001 with a narrow passing band is provided and cascade-connected to the optical nonlinear section. The optical output power level of the optical filter 3001 are detected, and the control circuit 3002 controls the optical filter 3001, such that the optical output power of this filter becomes the highest. Since the optical filter 3001 used in this embodiment has the variable region of the wavelength lies in 1.5 μm band and its width of the passing band is less than 1 nm, only the spectrum inverted wave can be extracted and the optical bandpass filter 3001 shows stable operation, such that the wave length of the spectrum inverted wave coincides with the central wave length of the optical filter 3001. Consequently, the light wave passing through an optical nonlinear section involves only the spectrum inverted wave, and other light waves are eliminated. Accordingly, in the optical direct-amplifying repeater system behind the optical nonlinear section, saturation of optical amplifiers can be suppressed. Moreover, the wavelength region, which has been used for signal transmission in the line section before the optical nonlinear section, can be used as a new wavelength region for other signal transmission in the line section behind the optical nonlinear section.

There are many modifications of embodiments on the invention other than those shown in FIGS. 1 to 6.

Various modifications can exist on the first preferred embodiment according to the invention shown in FIG. 1. On the transmitter, wavelengths of transmitted light waves are never restricted to 1.5 μm region, and may be 1.3 μm region or other wavelengths. In 1.5 μm region, a wavelength is never limited to 1.551 μm or 1.553 μm, and may be other wavelength. A wavelength stabilizing method is never restricted to a method of Fabry-Perot-Etalon, and may be other method using a diffraction-grating, a Mach-Zehnder interferometer or others. A transmitted signal waves is never restricted to a directly-intensity-modulated signal wave by changing injection current, and may be a signal wave modulated by an external modulator. A bit-rate of a signal light wave is never restricted to 10 Gb/s, and may be 5 Gb/s, 20 Gb/s, or higher or lower than those values.

Optical fibers for transmission 601 and 602 are never restricted to conventional optical fiber, and may be 1.5 μm-optimized optical fiber or those with other dispersion characteristics. A length of optical fiber is never restricted to 50 km, and may be 25 km, 100 km, or longer or shorter than those length. Lengths of optical fibers 601 and 602 are not required to be perfectly equal, and may have different lengths. An optical nonlinear medium used in an optical nonlinear section is never restricted to an optical fiber, and may be a semiconductor-laser-amplifier, or other optical nonlinear medium, such as a chalcogenide optical fiber, or other organic optical nonlinear mediums. An optical receiver is never restricted high sensitivity receiver with an optical pre-amplifier, and may be a high sensitivity optical receiver using an avalanche photodiode, or a PIN diode without an optical pre-amplifier. An optical amplifier is never limited to an erbium-doped-fiber amplifier, and may be a semiconductor-laser amplifier, or an optical fiber Raman amplifier.

There are many modifications on the second preferred embodiment according to the invention other than modified embedments of the first preferred invention. In the preferred embodiment shown in FIG. 3, signal and probe light waves are transmitted with the same polarizations. However, these waves may be transmitted with different but prescribed polarizations according to a characteristic of a nonlinear medium in an optical nonlinear section. A transmission distance is not limited to 50 km, and may be longer or shorter than 50 km.

Polarization dispersion is not limited to 0.7 ps, and may be larger or smaller than 0.7 ps. Moreover, a wavelength separation is not limited to 3 nm (1.553 μm-1.550 μm), and may be larger or smaller than this value.

There are many modifications on the third preferred embodiment according to the invention shown in FIG. 4. In addition to modifications similar to those of the first preferred embedments, there are some modifications described as follows.

A length of an optical fiber is never restricted to 1000 km, and may be longer or shorter than 1000 km. A distance from a transmitter to an optical nonlinear section is never restricted to 500 km and may be 550 km, 600 km, or longer or shorter than these distances, if sufficient dispersion compensation effect can be achieved.

There are many modifications on the fourth preferred embodiments according to the invention shown in FIG. 5. A situation of an installation is never restricted to that shown in FIG. 5, and any other situation of an installation can be permitted. The 1.5 μm-optimized optical fibers can be newly installed at a certain section and utilized. The above mentioned way has a great economical advantage as compared with the case in which the whole installed optical fibers are replaced with 1.5 μm-optimized optical fibers. Further, using a wavelength region excepting those being used, wavelength-division-multiplexed communication in 1.5 μm wavelength region and 1.3 μm transmission can be carried out. Using conventional optical fiber, wavelength multiplexed communication in 1.3 μm wavelength region.

Figure 6:
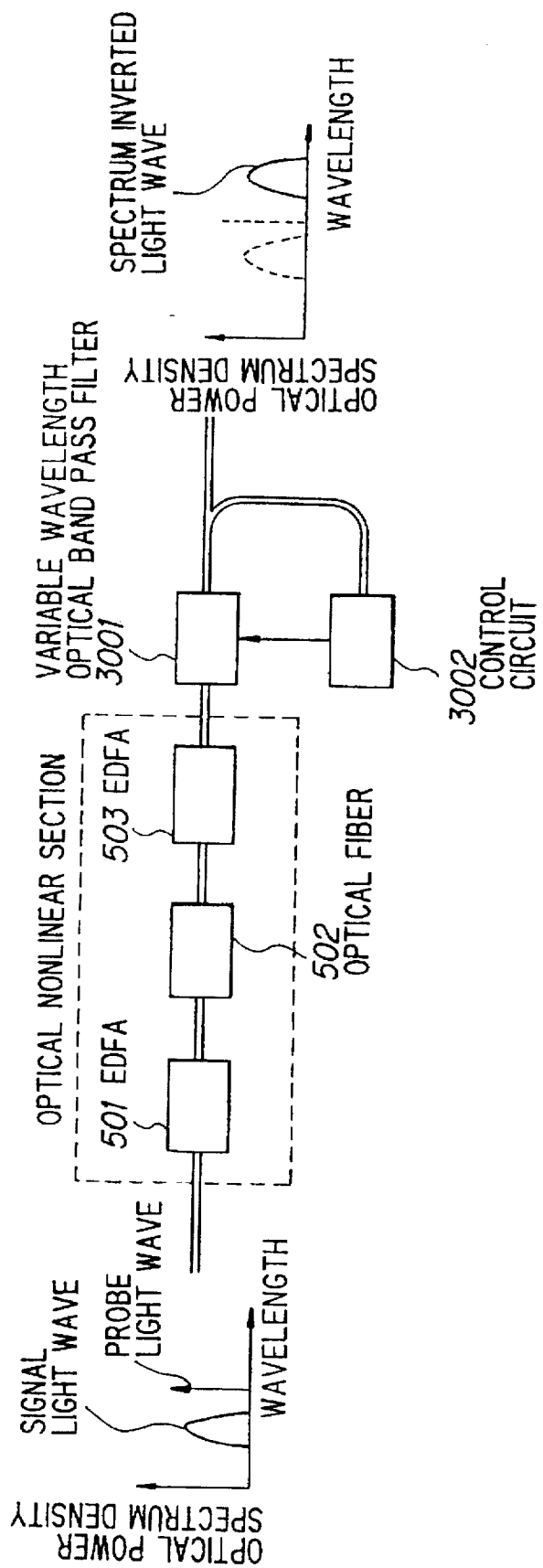
FIG. 6 shows fifth preferred embodiment according to the invention.

On the fifth preferred embodiment according to the invention shown in FIG. 6, in which only a spectrum inverted wave is extracted using an optical bandpass filter, a modification can exist. For example, by utilizing induced Brillouin scattering effect, signal and probe light waves with high power levels are guided to a backward direction, and only a spectrum inverted wave is allowed to propagate.

By using the invention, the optical communication, which cannot be realized by limitation of dispersion, can be put to practical use. The invention provides an optical communication system using a spectrum inverted light wave, which constructs a stable and economical system.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An optical communication apparatus comprising:

only a single optical transmitter which transmits at least two light waves including a signal light wave and a probe light wave, said optical transmitter comprising first and second light sources which are disposed proximate to each other inside said optical transmitter and which output said signal light wave and said probe light wave, respectively, an optical nonlinear section which generates an optical spectrum component by optical nonlinear interaction between said signal and probe light waves, an optical receiver which receives said optical spectrum component generated by said optical nonlinear interaction without receiving said signal and probe light waves, and optical transmission lines which couple said optical transmitter, said optical nonlinear section, and said optical receiver together.

2. An optical communication apparatus, according to claim 1, wherein:

said optical transmitter transmits a signal light wave and a probe light wave with predetermined polarizations respectively.

3. An optical communication apparatus, according to claim 1, wherein:

said optical transmitter comprises a device to control polarizations of said signal and probe light waves, respectively, to maintain a predetermined relationship between polarizations of these waves at said optical nonlinear section.

4. An optical communication apparatus, according to claim 1, wherein:

said optical nonlinear section comprises an optical fiber which is a nonlinear element through which said signal and probe light waves propagate.

5. An optical communication apparatus, according to claim 1, wherein:

said nonlinear section comprises a device to selectively transmit said optical spectrum component generated by said optical nonlinear interaction.

6. An optical communication apparatus, according to claim 1, wherein:

said optical transmission lines include at lease one optical amplifying repeater.

7. An optical communication apparatus, according to claim 2, wherein:

said signal and probe light waves have the same polarizations.

8. An optical communication apparatus as claimed in claim 1, wherein said optical transmitter outputs said signal light wave and said probe light wave without using an optical amplifier in said optical transmitter.

9. An optical communication apparatus as claimed in claim 1, wherein the outputs of said first and second light sources are directly coupled to each other.

10. An optical communication apparatus, comprising:
only a single transmission unit comprising:
- a first optical transmitter, inside said transmission unit, for transmitting a signal light of a first predetermined wavelength; and
- a second optical transmitter, also inside said transmission unit, for transmitting a probe light of a second predetermined wavelength;
- an optical coupler, inside said transmission unit, for coupling said signal light and said probe light to supply a coupled light to an optical fiber;
- an optical nonlinear section, outside said transmission unit, for generating an optical spectrum component generated by optical nonlinear interaction between said signal and probe lights of said coupled light, said optical nonlinear section being positioned at a predetermined location of said optical fiber; and
- an optical receiver for receiving said optical spectrum component via said optical fiber from said optical nonlinear section without receiving said signal and probe lights.

11. An optical communication apparatus as claimed in claim 10, wherein said first and second optical transmitters are disposed proximate to each other in said transmission unit.

12. An optical communication apparatus as claimed in claim 10, wherein the outputs of said first and second optical transmitters are directly coupled to each other.

13. An optical communication apparatus as claimed in claim 10, wherein said transmission unit outputs said signal light wave and said probe light wave without using an optical amplifier in said transmission unit.

14. An optical communication apparatus according to claim 10, wherein said first optical transmitter transmits said signal light wave and said second optical transmitter transmits said probe light wave with predetermined polarizations, respectively.

15. An optical communication apparatus comprising:
- an optical transmitter which transmits at least two light waves including a signal light wave and a probe light wave,
- an optical nonlinear section which generates an optical spectrum component by optical nonlinear interaction between said signal and probe light waves,
- an optical receiver which receives said optical spectrum component generated by said optical nonlinear interaction without receiving said signal and probe light waves,
- optical transmission lines which couple said optical transmitter, said optical nonlinear section, and said optical receiver together,
- a controller for controlling the transmission of the probe light wave, and
- a detector, coupled to said optical transmission lines, which detects a power of said optical spectrum component and provides a signal for controlling said control system based on said power.

16. An optical communication apparatus as claimed in claim 15, wherein said controller is in said optical transmitter.

* * * * *